(12) United States Patent
Stroup

(10) Patent No.: US 6,814,285 B1
(45) Date of Patent: Nov. 9, 2004

(54) CREDIT INFORMATION STORAGE AND TRANSFERRING DEVICE

(76) Inventor: Chip B. Stroup, 3629 Rolling Lane Cir., Midwest City, OK (US) 73110

(*) Notice: Subject to any disclaimer, the term of this patent is extended or adjusted under 35 U.S.C. 154(b) by 489 days.

(21) Appl. No.: 09/904,765

(22) Filed: Jul. 13, 2001

(51) Int. Cl.[7] .................................. G06K 7/00
(52) U.S. Cl. ...................... 235/439; 235/380; 235/441; 235/449; 361/679
(58) Field of Search ................... 235/380, 382, 235/382.5, 439, 441, 449, 486, 375, 379, 492, 493, 440; 705/17, 39, 41; 361/680, 681, 679, 737; 902/24, 25, 26, 27

(56) References Cited

U.S. PATENT DOCUMENTS

| | | | |
|---|---|---|---|
| D280,214 S | | 8/1985 | Opel |
| 4,700,055 A | | 10/1987 | Kashkashian, Jr. |
| 4,812,632 A | * | 3/1989 | Kakinuma et al. ....... 235/449 X |
| 4,816,654 A | | 3/1989 | Anderl et al. |
| 5,039,846 A | * | 8/1991 | Komaki ................. 360/680 X |
| 5,057,676 A | * | 10/1991 | Komaki ................. 361/680 X |
| 5,179,502 A | * | 1/1993 | Matsuda .................... 361/680 |
| 5,227,615 A | * | 7/1993 | Oogita ................... 235/441 X |
| 5,233,547 A | * | 8/1993 | Kapp et al. ............ 235/380 X |
| 5,276,311 A | | 1/1994 | Hennige |
| 5,416,730 A | * | 5/1995 | Lookofsky ................. 361/680 |
| 5,530,232 A | | 6/1996 | Taylor |
| 5,857,079 A | | 1/1999 | Claus et al. |
| 5,895,903 A | * | 4/1999 | Abe et al. .................. 235/380 |
| 5,902,981 A | * | 5/1999 | Dethloff ................. 235/380 X |
| 6,315,195 B1 | * | 11/2001 | Rmachandran ............ 235/380 |
| 2002/0139844 A1 | * | 10/2002 | Rochman et al. .......... 235/380 |

FOREIGN PATENT DOCUMENTS

| | | | |
|---|---|---|---|
| EP | | 0 793 204 A2 * | 9/1997 |
| WO | | WO 94/17498 A1 * | 8/1994 |

* cited by examiner

*Primary Examiner*—Jared J. Fureman

(57) ABSTRACT

A credit information storage and transferring device for using one debit card for multiple credit accounts. The credit information storage and transferring device includes a debit card having a magnetic strip thereon for removably storing information. A memory assembly stores information. A plurality of input actuators inputs and retrieves information. A display displays the information inputted. A control for processing data is operationally coupled to the memory assembly, the input actuators and the display. A writing assembly writes selected information on the magnetic strip and is adapted for replacing information on the magnetic strip with a newer set of information. The writing assembly is operationally coupled to the control. Wherein sets of information from multiple credit accounts may be stored in the memory assembly so that the credit account information may be selectively written on the debit card.

3 Claims, 5 Drawing Sheets

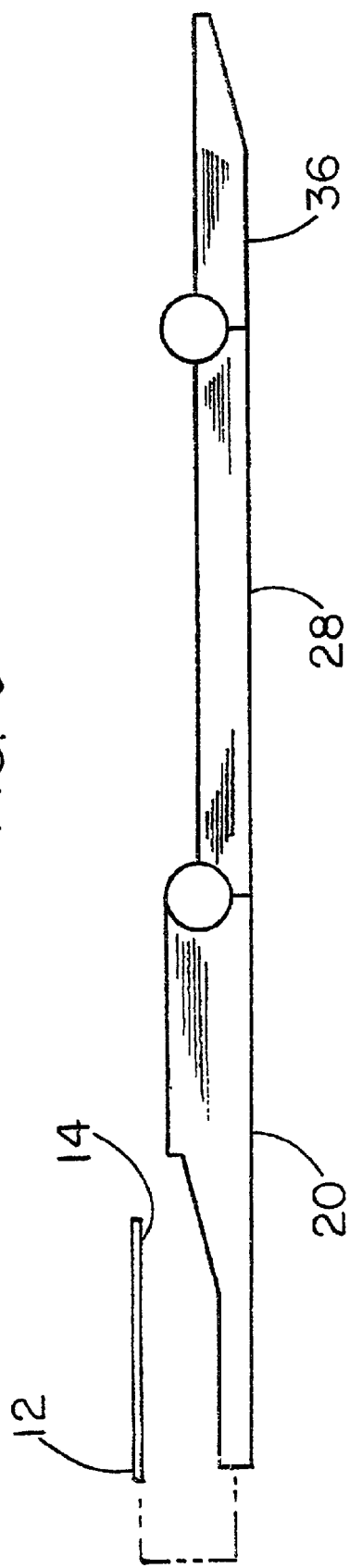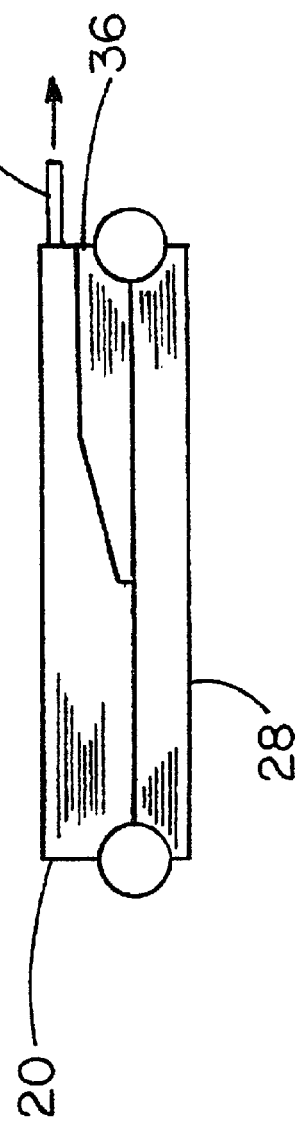
FIG. 5
FIG. 6 ch1CREDIT INFORMATION STORAGE AND TRANSFERRING DEVICE

BACKGROUND OF THE INVENTION

1. Field of the Invention

The present invention relates to debit card systems and more particularly pertains to a new credit information storage and transferring device for using one debit card for multiple credit accounts.

2. Description of the Prior Art

The use of debit card systems is known in the prior art. More specifically, debit card systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Patent Nos. 5,276,311; 4,700,055; 5,857,079; 4,816,654; Des. 280,214; and 5,530,232.

While these devices fulfill their respective, particular objectives and requirements, the aforementioned patents do not disclose a new credit information storage and transferring device. The inventive device includes a debit card having a magnetic strip thereon for removably storing information. A memory means stores information. A plurality of input actuators inputs and retrieves information. A display displays the information inputted. A control for processing data is operationally coupled to the memory means, the input actuators and the display. A writing means writes selected information on the magnetic strip and is adapted for replacing information on the magnetic strip with a newer set of information. The writing means is operationally coupled to the control. Wherein sets of information from multiple credit accounts may be stored in the memory means so that the credit account information may be selectively written on the debit card.

In these respects, the credit information storage and transferring device according to the present invention substantially departs from the conventional concepts and designs of the prior art, and in so doing provides an apparatus primarily developed for the purpose of using one debit card for multiple credit accounts.

SUMMARY OF THE INVENTION

In view of the foregoing disadvantages inherent in the known types of debit card systems now present in the prior art, the present invention provides a new credit information storage and transferring device construction wherein the same can be utilized for using one debit card for multiple credit accounts.

The general purpose of the present invention, which will be described subsequently in greater detail, is to provide a new credit information storage and transferring device apparatus and method which has many of the advantages of the debit card systems mentioned heretofore and many novel features that result in a new credit information storage and transferring device which is not anticipated, rendered obvious, suggested, or even implied by any of the prior art debit card systems, either alone or in any combination thereof.

To attain this, the present invention generally comprises a debit card having a magnetic strip thereon for removably storing information. A memory means stores information. A plurality of input actuators inputs and retrieves information. A display displays the information inputted. A control for processing data is operationally coupled to the memory means, the input actuators and the display. A writing means writes selected information on the magnetic strip and is adapted for replacing information on the magnetic strip with a newer set of information. The writing means is operationally coupled to the control. Wherein sets of information from multiple credit accounts may be stored in the memory means so that the credit account information may be selectively written on the debit card.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new credit information storage and transferring device apparatus and method which has many of the advantages of the debit card systems mentioned heretofore and many novel features that result in a new credit information storage and transferring device which is not anticipated, rendered obvious, suggested, or even implied by any of the prior art debit card systems, either alone or in any combination thereof.

It is another object of the present invention to provide a new credit information storage and transferring device which may be easily and efficiently manufactured and marketed.

It is a further object of the present invention to provide a new credit information storage and transferring device which is of a durable and reliable construction.

An even further object of the present invention is to provide a new credit information storage and transferring device which is susceptible of a low cost of manufacture with regard to both materials and labor, and which accordingly is then susceptible of low prices of sale to the consuming public, thereby making such credit information storage and transferring device economically available to the buying public.

Still yet another object of the present invention is to provide a new credit information storage and transferring device which provides in the apparatuses and methods of the prior art some of the advantages thereof, while simultaneously overcoming some of the disadvantages normally associated therewith.

Still another object of the present invention is to provide a new credit information storage and transferring device for using one debit card for multiple credit accounts.

Yet another object of the present invention is to provide a new credit information storage and transferring device which includes a debit card having a magnetic strip thereon for removably storing information. A memory means stores information. A plurality of input actuators inputs and retrieves information. A display displays the information inputted. A control for processing data is operationally coupled to the memory means, the input actuators and the display. A writing means writes selected information on the magnetic strip and is adapted for replacing information on the magnetic strip with a newer set of information. The writing means is operationally coupled to the control. Wherein sets of information from multiple credit accounts may be stored in the memory means so that the credit account information may be selectively written on the debit card.

Still yet another object of the present invention is to provide a new credit information storage and transferring device that lets a user hold only one credit card type card while having the information from all of their credit cards.

Still yet another object of the present invention is to provide a new credit information storage and transferring device that lets a user select between different debit and credit accounts.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic side view of the present invention.

FIG. 6 is a schematic side view of the present invention.

DESCRIPTION OF THE PREFERRED EMBODIMENT

Figure 1:
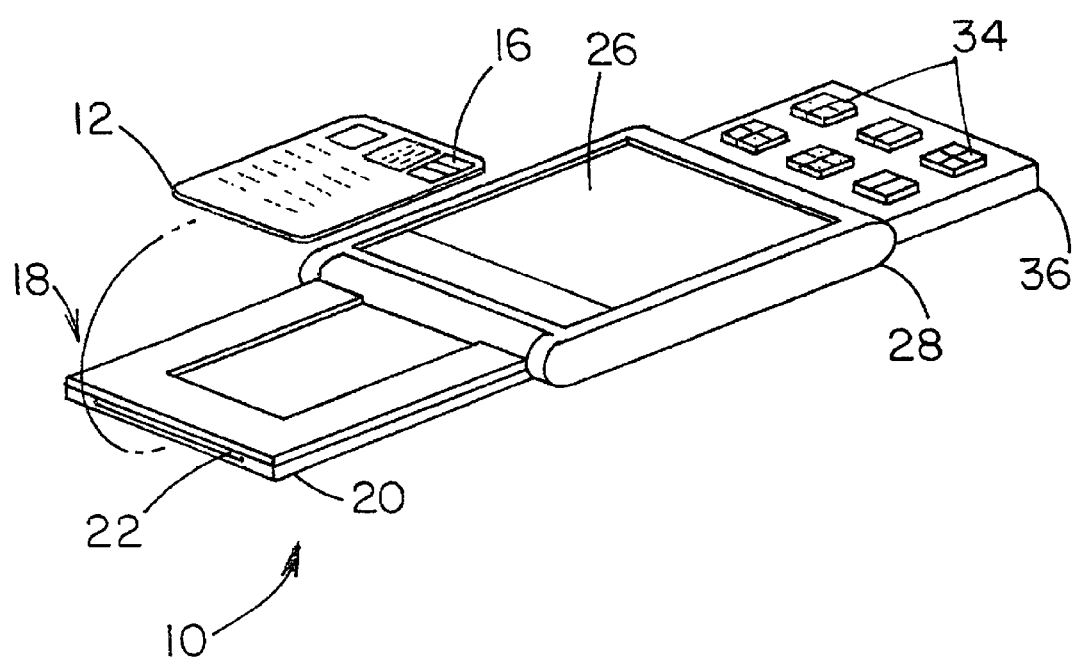
FIG. 1 is a schematic perspective view of a new credit information storage and transferring device according to the present invention.

With reference now to the drawings, and in particular to FIGS. 1 through 6 thereof, a new credit information storage and transferring device embodying the principles and concepts of the present invention and generally designated by the reference numeral 10 will be described.

As best illustrated in FIGS. 1 through 6, the credit information storage and transferring device 10 generally comprises a debit card 12 having a magnetic strip 14 thereon for removably storing information. A microchip 16, also conventionally known as a smart-chip, is positioned on the debit card 12 for identifying the debit card 12.

A reading means 18 reads the microchip 16. The reading means 16 is positioned in a first panel 20. The first panel 20 has a slot 22 therein for receiving the debit card 12 such that the debit card 12 may be positioned against the reading means 18. The reading means 18 is adapted for reading a specific microchip 16.

A control 24 for processing data is positioned in a second panel 28. The control 24 is operationally coupled to the reading means 18. A display means 26 is mounted on a first side of the second panel 28. The display means 26 is operationally coupled to the control 24 for displaying information. The display means 26 preferably comprises a liquid crystal display though any conventional display may be used. The second panel 28 is hingedly coupled to the first panel 20 such that the first panel 20 is positionable over the display means 26.

Figure 4:
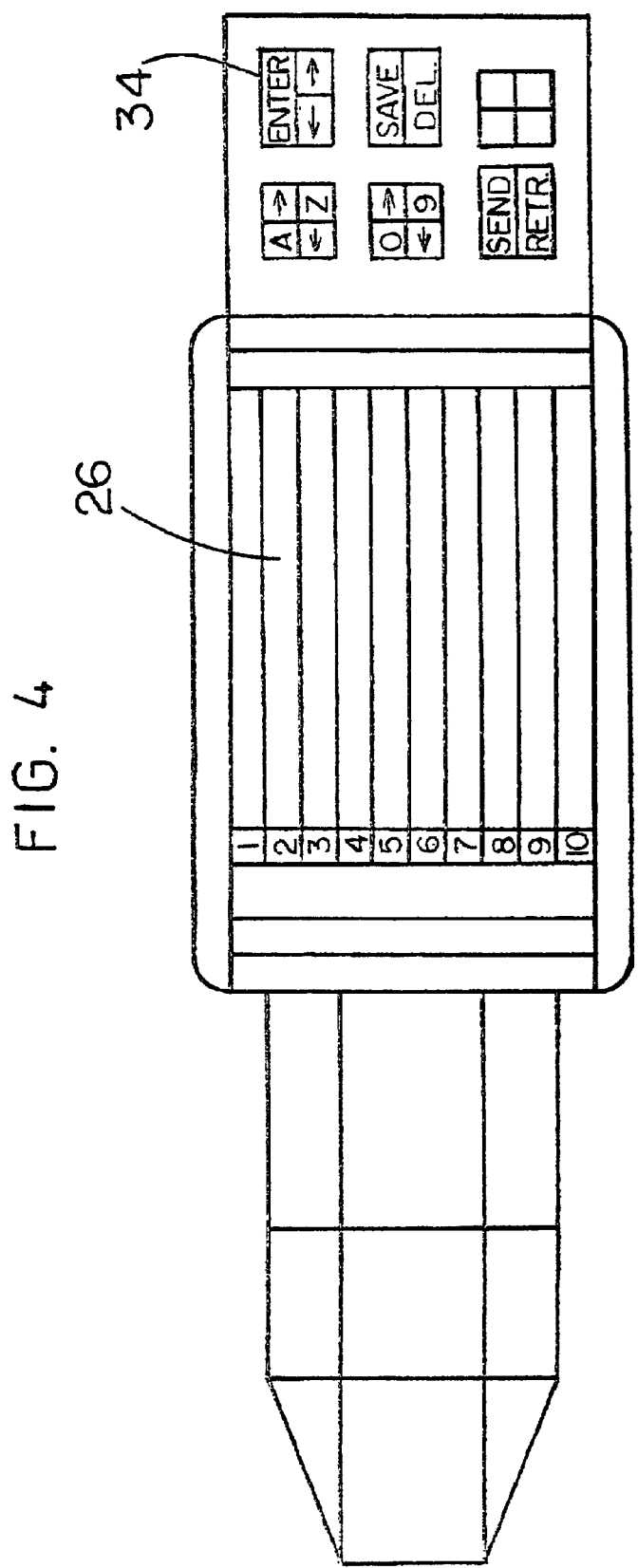
FIG. 4 is a schematic top view of the present invention.

A memory means 30 for storing sets of information is operationally coupled to the control 24 and is positioned in the second panel 28. The control 24 turns the memory means 30 on when the microchip 16 is positioned in the slot 22. The memory means 30 is preferably conventional ROM type memory. The information may be displayed by the display means 26 in a grid pattern of sets as shown in FIG. 4.

A writing means 32 for writing selected information on the magnetic strip is adapted for replacing information on the magnetic strip 14 with a newer set of information. The writing means 32 is positioned in the first panel 20 for coming into contact with the magnetic strip when the debit card 12 is positioned in the slot 22. The writing means 32 is operationally coupled to the control 24. The writing means erases whatever information is placed on the magnetic strip and replaces it with the selected information.

A plurality of input actuators 34 are used for accessing information in the memory means 30 and for inputting information into the control 24 such that the information is stored in the memory means 30. The input actuators 34 are operationally coupled to the control 24. The input actuators 34 are positioned on a third panel 36. The third panel 36 is hingedly coupled to the second panel 28.

Figure 2:
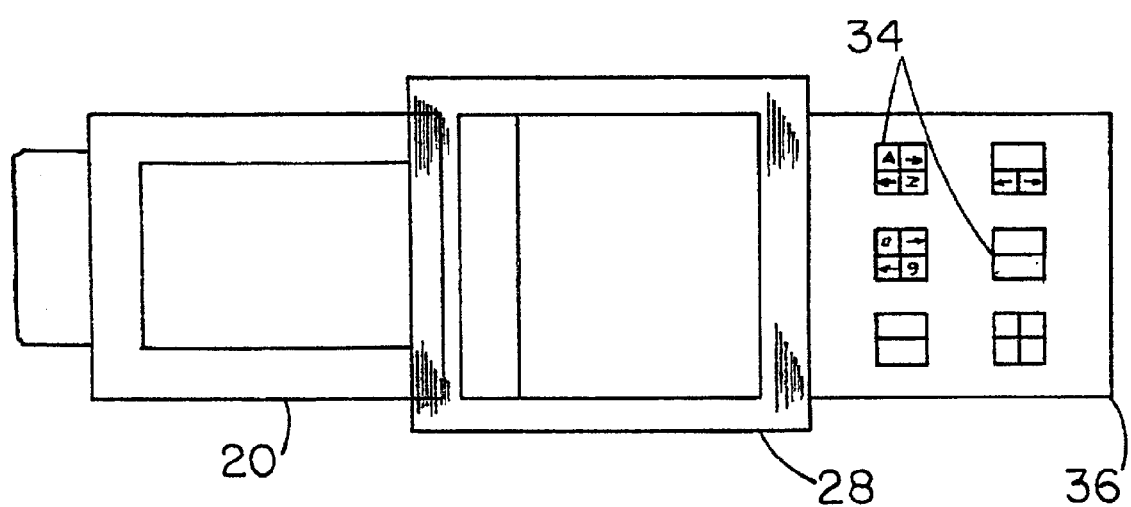
FIG. 2 is a schematic top view of the present invention.
Figure 3:
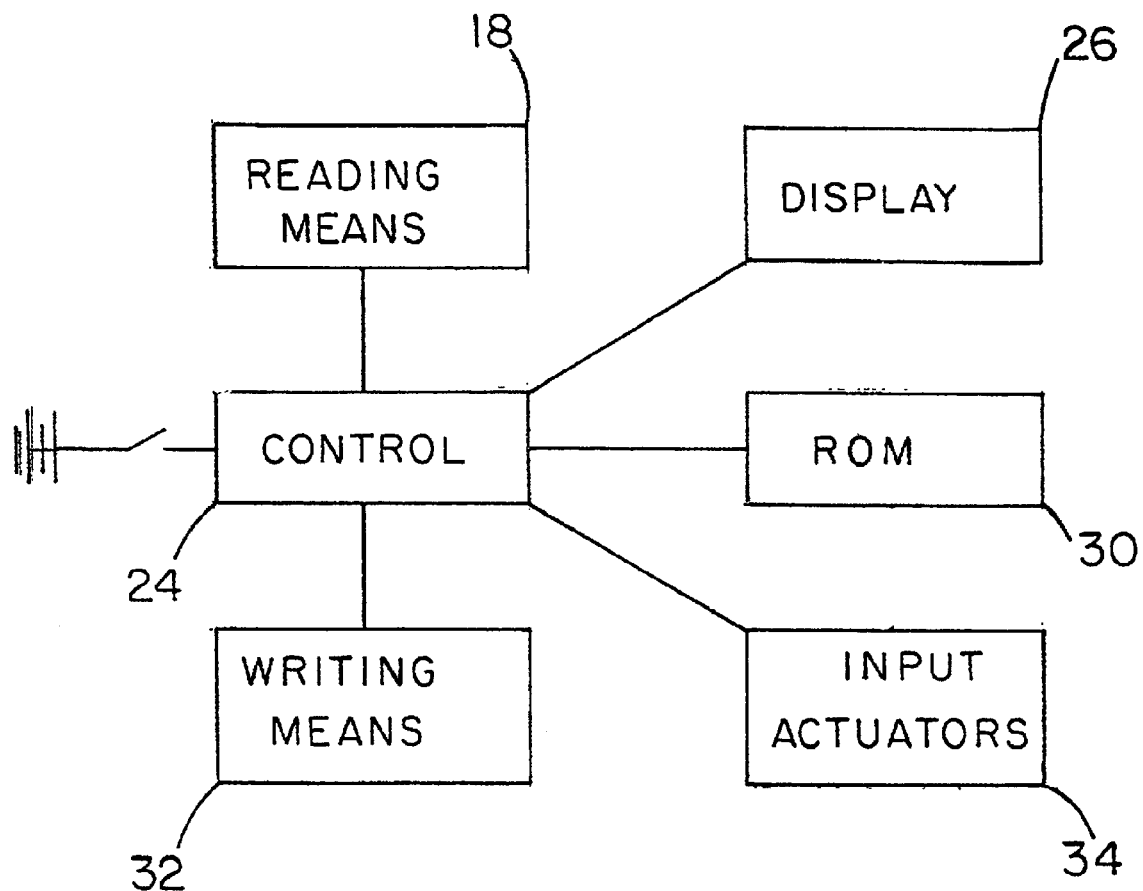
FIG. 3 is a schematic view of the present invention.

Two versions of the device are shown. The first version is shown in FIGS. 1 and 2. The second version is shown in FIGS. 4 through 6. The second version has the advantage of contoured panels which fit together to form a box shaped device for ease of storage and transportation.

In use, sets of information from multiple credit accounts may be stored in the memory means. The credit account information may be selectively written on the debit card 12. This allows a person to carry one credit card type debit card which may be selectively programmed with the information from one of a plurality of credit accounts. The person uses the display and the actuators to input the information from each of the credit accounts. The debit card is placed in the slot. The reading means 18 recognizes if the debit card 12 is the correct one for the device 10 by reading the microchip 16. If the microchip 16 is recognized, the memory means 30 is turned on so that the credit account information may be accessed and transferred to the debit card 12. The debit card 12 is then read by conventional debit and credit card reading machines.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A debit card information storage and transferring device comprising:

a debit card having a magnetic strip thereon for removably storing information;

a memory means for storing information;

a plurality of input actuators for inputting and retrieving information;

a display for displaying said information;

a control for processing data, said control being operationally coupled to said memory means, said input actuators and said display;

a writing means for writing selected information on said magnetic strip, said writing means being adapted for replacing information on said magnetic strip with a newer set of information, said writing means being operationally coupled to said control;

wherein sets of information from multiple credit accounts may be stored in said memory means, wherein said credit account information may be selectively written on said debit card:

a microchip being positioned on said debit card for identifying said debit card;

a reading means for reading said microchip, said reading means being operationally coupled to said control, said reading means being adapted for reading a specific microchip; and wherein said control turns said memory means on when said microchip is being read by said reading means; and wherein said reading means and said writing means are positioned in a first panel, said first panel having a slot therein for receiving said debit card such that said debit card may be positioned against said reading means, said control being positioned in a second panel, said display means being mounted on a first side of said second panel, said second panel being hingedly coupled to said first panel such that said first panel may be positioned over said display means.

2. The debit card information storage and transferring device as in claim 1, wherein said input actuators are positioned on a third panel, said third panel being hingedly coupled to said second panel.

3. A debit card information storage and transferring device comprising:

a debit card having a magnetic strip thereon for removably storing information, a microchip being positioned on said debit card for identifying said debit card;

a reading means for reading said microchip, said reading means being positioned in a first panel, said first panel having a slot therein for receiving said debit card such that said debit card may be positioned against said reading means, said reading means being adapted for reading a specific microchip;

a control for processing data, said control being positioned in a second panel, said control being operational coupled to said reading means, a display means being mounted on a first side of said second panel, said display means being operationally coupled to said control for displaying information, said display means comprising a liquid crystal display, said second panel being hingedly coupled to said first panel such that said first panel is positionable over said display means;

a memory means for storing sets of information, said memory means being operationally coupled to said control and being positioned in said second panel, said control turning said memory means on when said microchip is positioned in said slot;

a writing means for writing selected information on said magnetic strip, said writing means being adapted for replacing information on said magnetic strip with a newer set of information, said writing means being operationally coupled to said control, said writing means being located in said first panel and positioned for abutting said magnetic strip when said debit card is positioned in said slot;

a plurality of input actuators for accessing information in said memory means and for inputting information into said control such that said information is stored in said memory means, said input actuators being operationally coupled to said control, said input actuators being positioned on a third panel, said third panel being hingedly coupled to said second panel;

wherein sets of information from multiple credit accounts may be stored in said memory means, wherein said credit account information may be selectively written on said debit card.

* * * * *